Aug. 25, 1925.

C. LE G. FORTESCUE 1,551,300

PHASE BALANCING METHOD AND SYSTEM

Filed April 13, 1922

WITNESSES:
H.B.Funk.
O.B.Buchanan

INVENTOR
Charles Le G. Fortescue.
BY
ATTORNEY

Patented Aug. 25, 1925.

1,551,300

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-BALANCING METHOD AND SYSTEM.

Application filed April 13, 1922. Serial No. 552,242.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase-Balancing Methods and Systems, of which the following is a specification.

My invention relates to phase-balancing systems and it has particular reference to means for maintaining balanced voltages at the terminals of a phase-balancer or at the terminals of a generator supplying unbalanced polyphase loads.

In my Patent #1,376,420, granted May 3, 1921, for phase balancers, I have shown means inserted in the damper winding of a phase-balancer for neutralizing both the reactive impedance and the ohmic impedance of the machine in order to perfect the phase-balancing operation. I have found, however, that such complicated apparatus is not necessary for commercially satisfactory operation, since it is possible, by careful design, to reduce the ohmic impedance to substantially negligible values at the expense of the reactive impedance of the machine.

It is an object of my invention, therefore, to provide a phase-balancer or a phase-converter having simple neutralizing or boosting means for overcoming the effect of the inevitable inductive reactance of the machine to negative phase-sequence currents circulating therein.

A further object of my invention is to provide a static condenser in series-circuit relation to the secondary winding of a phase-balancer for neutralizing the effect of the reactive impedance of the machine.

A still further object of my invention is to apply the principles of the shunt phase-balancers having booster means for neutralizing all or a part of the internal impedances thereof to any other machine performing the function of phase-balancing, such as a polyphase generator supplying a balanced polyphase load and also a load having an unbalanced single-phase component.

With these and other objects in view, my invention consists in the methods and apparatus described in the following specification and illustrated in the accompanying drawing, wherein—

Figure 1:
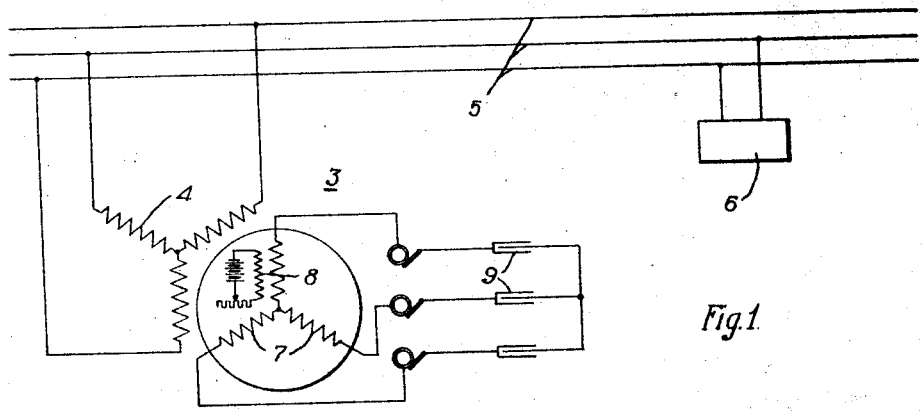
Figure 2:
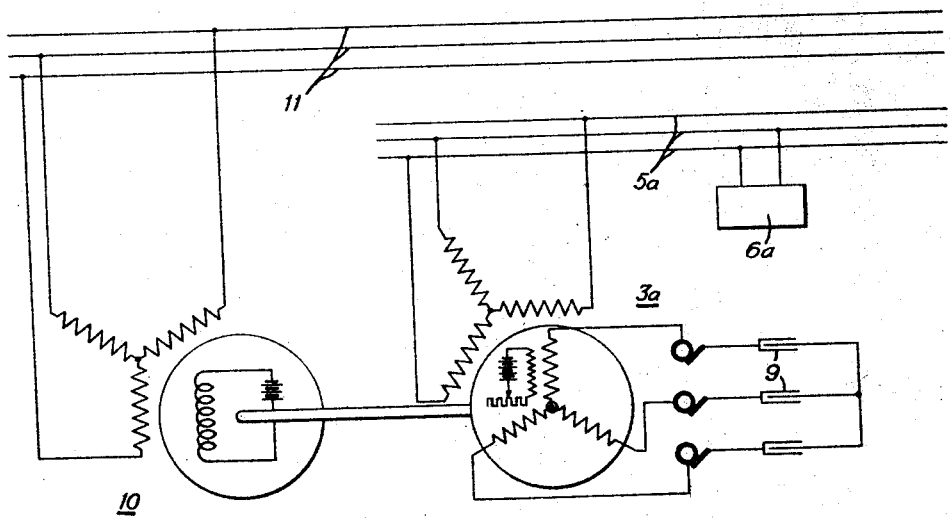

Fig. 1 is a diagrammatic view of circuits and apparatus illustrating my invention as applied to a phase-balancer, and Fig. 2 is a similar view illustrating my invention as applied to a motor-generator set.

In Fig. 1 is shown a phase-balancer 3 having a primary winding 4 which is shunt-connected to a polyphase line 5 which is unbalanced, as by means of a single-phase load 6. The phase-balancer 3 is also provided with a wound damper winding 7 and a uni-directional exciting winding 8 for causing the machine to operate at synchronous speed with power-factor correction, if desired. Connected in series with the damper windings 7 are a plurality of static condensers 9 of such proportions that the inductive impedance component of the internal impedance of the machine 3 is neutralized by the condensers 9.

By the simple means just described, the phase-balancing operation of the machine 3 may be made substantially perfect with careful design of the machine as to the elimination of resistance losses and, furthermore, the phase-balancing operation is accomplished without resort to adjustable apparatus of any kind.

In Fig. 2 I have shown the same invention applied to a machine 3a operating as a generator supplying power to a polyphase load circuit 5a having an unbalanced single-phase load component 6a. The generator 3a may be driven by any form of prime mover, such as a synchronous motor 10, which is connected to a balanced polyphase transmission line 11. By the application of the booster means 9 for producing, in effect, a machine having zero reactance to negative phase-sequence component currents, substantially balanced electromotive forces may be maintained at the terminals of the polyphase generator, or at any other point in the polyphase line connected thereto, notwithstanding the fact that unbalanced polyphase loads are supplied thereby.

While I have limited my disclosure to static condensers 9, it is to be understood that such condensers are merely illustrative and that any other equivalent means for producing the effect of a condensive reactance may be substituted without departing from my invention in its broadest aspects.

Furthermore, it will be understood, in connection with Fig. 2, that my invention contemplates the employment of any booster means for neutralizing either the reactive or the ohmic components or both components of the internal impedances of a polyphase generator, or of said internal impedances plus that of any desired portion of the transmission line connected thereto.

It will be further understood that while I have illustrated a uni-directional winding 8 in addition to the secondary winding 7, the unidirectional winding may be entirely omitted or may be combined with the secondary winding in a manner well understood by those skilled in the art.

I, therefore, desire that the appended claims shall be construed to cover all modifications and equivalents which would readily occur to those skilled in the art, regardless of the specific structure and functions described and illustrated.

I claim as my invention:

1. The combination with a dissymmetrically loaded polyphase line, of a polyphase generator therefor having a wound damper winding, means for driving the generator, and a source of double-frequency electromotive forces connected in series relation to said winding.

2. The combination with an unequally loaded polyphase line, of a polyphase generator therefor having a wound damper winding, means for driving the generator, and a substantially pure capacitive reactance means connected in series relation to said winding.

3. The combination with a polyphase generator connected to a line supplying one or more unbalanced single-phase loads, of means for driving the generator, and means for maintaining substantially balanced polyphase voltages at a predetermined point in the line, said last-mentioned means comprising static condensers for producing series resonance with the reactive impedances of the generator and leads to negative-phase-sequence currents.

4. The combination with an unequally loaded polyphase line, of a polyphase generator therefor having a wound damper winding, means for driving the generator, and static condensers connected in series relation to said winding.

5. The combination with an unequally loaded polyphase line, of a polyphase generator therefor having a wound damper winding, means for driving the generator, and static-condenser means connected in series relation to said winding for overcoming the inductive reactance of said winding.

6. The combination with an unequally loaded polyphase line, of a polyphase generator therefor having a wound damper winding, means for driving the generator, and static-condenser means connected in series relation to said winding for producing substantially series resonance with the internal impedances of said generator to negative-phase-sequence currents.

7. The combination with a machine adapted to maintain balanced polyphase voltages and having a wound damper winding, of a short-circuiting circuit consisting solely of conductors and static condensers in series with said winding.

8. The combination with a machine adapted to maintain balanced polyphase voltages and having a wound damper winding, of a short-circuiting circuit consisting solely of static condensers connected in series circuit relation to said winding and having such capacity as to produce substantially series resonance with the internal reactive impedances to negative-phase-sequence currents.

9. The combination with a machine adapted to maintain balanced polyphase voltages and having a wound damper winding, of a short-circuiting circuit consisting solely of static condensers connected in series circuit relation to said winding and having such capacity as to overcome the inductive reactance of said winding.

10. The method of maintaining substantially balanced voltages on a polyphase generator machine which consists in causing a mechanical driving torque to be applied to said machine, and substantially neutralizing only its effective inductive impedance to negative-phase-sequence currents.

In testimony whereof I have hereunto subscribed my name this 11th day of April, 1922.

CHARLES LE G. FORTESCUE.